Sept. 24, 1968 J. D. PETERSON ET AL 3,403,204

METHOD OF IMPREGNATION

Filed June 24, 1966

INVENTOR
John D. Peterson
Frank M. Simpson

BY [signature]
ATTORNEY

United States Patent Office
3,403,204
Patented Sept. 24, 1968

3,403,204
METHOD OF IMPREGNATION

John D. Peterson and Frank M. Simpson, Richardson, Tex., assignors to Self-Organizing Systems, Inc., Garland, Tex., a corporation of Texas Filed June 24, 1966, Ser. No. 560,295
13 Claims. (Cl. 264—101)

The present invention relates to methods for impregnation of various devices and more particularly to the improved method for impregnation of a device wherein a case at least partially enclosing the object to be impregnated is filled with a suitable resin. The invention is especially adapted to the impregnation of electrical components and modules.

Various types of resins which are initially in the liquid state but which may be reacted either chemically or otherwise to produce a change in the molecular structure resulting in a resin of the desired hardness and electrical characteristics are known. Electrical components are often impregnated in such resins in order to provide physical strength and environmental protection to the device as well as to provide the necessary insulating properties. In the past, it has been common practice to utilize an open ended case or mold into which the component is placed and thereafter fill the mold with the desired resin. The term "impregnation," as used herein, refers to such a filling, although impregnation in the more commonly used sense may also occur. However, in order for the resin to provide the necessary function, it must be one that will readily wet and adhere to many types of surfaces. Accordingly, substantial difficulties have been encountered with the resin being placed on portions of the lead or case in which it is not desired. The removal, subsequent to curing of the resin, from undesired areas presents substantial problems.

The present invention provides an improved method of impregnation of components in such resins, and particularly epoxy resins. In accordance with the present invention, the device to be impregnated is positioned within a case having an aperture. A member having an opening therein is positioned in communicating relationship with the aperture with the member extending from the case. Thereafter, a coating of strippable material is applied over the case and the member. The member can be removed to form a passageway in the strippable material communicating with the interior of the case through the aperture. Alternatively, the member may be left in place. Thereafter, the case is filled with the impregnating matetial through the aperture and either the opening in the member, if the member is left in place, or the passageway formed in the strippable material if the member is removed to form such a passageway. Alternate vacuum and pressure cycles are suitably employed during the filling operation. The strippable material is then removed. The resultant assembly is free of surfaces coated with undesired impregnating material, obviating the necessity for a subsequent cleaning. Also, the device is dimensionally correct and of proper configuration without the necessity for additional machining or shaping.

In accordance with one embodiment of the invention wherein electrical components having electrical terminals are to be impregnated, the electrical device is mounted onto a carrier block having holes formed therein to receive the electrical terminations which are to extend from the completed unit. The case utilized is one having an opening to receive the electrical device and the case is fitted over the electrical device with the carrier block functioning to close the opening in the case. The carrier block is suitably formed of polytetrafluoroethylene sold under the trademark Teflon or other similar material to which the impregnating material will not adhere. After the strippable material is removed, subsequent to impregnation, the carrier block can be removed from the leads to provide an exposed surface comprising the impregnating material which is flat and free of voids. The carrier block and strippable material prevent the impregnating material being present on the electrical terminations or the case.

In accordance with another embodiment of the invention, the electrical device is mounted onto a carrier plate which may be of any rigid material that provides the necessary electrical characteristics and which may be machined to fit within the opening of the case to close the opening. In this instance, the carrier block is actually molded within the resin with a strippable material functioning to mask the electrical terminations and the body of the case from the impregnating resin. The carrier block functions to close the hole to prevent the strippable material extending into the cavity of the case to an undesirable extent.

Further, in accordance with one embodiment of the invention, the member which is inserted into the aperture of the case for purposes of forming a passageway in the strippable material is of substantial volume such that when the member is removed, a reservoir is formed in the strippable material of sufficient volume to hold a quantity of the impregnating resin sufficient to at least fill the cavity of the case. In accordance with another embodiment of the invention, tubing is utilized as the member which is inserted in the aperture, resulting in a formation of a length of removable plastic tubing through which the impregnating resin may be applied to the interior of the case.

It will be noted that the strippable materials will normally be those that are liquid at elevated temperatures but solid at ambient temperaures. The members insered into the apertures are suitably formed with passageways therein to permit venting of the interior of the case to atmospheric pressure when the strippable material is applied, thereby insuring that voids will not be formed between the strippable material and the surface of the case. The member utilized for forming the passageway in the strippable material is also suitably formed of Teflon or at least having a Teflon outer surface to expedite removal of the member for formation of the passageway in the strippable material. However, any material to which the strippable material will not readily adhere may be utilized as the member used for forming the passageway.

Many objects and advantages of the invention will become readily apparent to those skilled in the art as the following detailed description of a preferred embodiment of the same unfolds when taken in conjunction with the appended drawings wherein like reference numerals denote like parts and in which.

Figure 1:
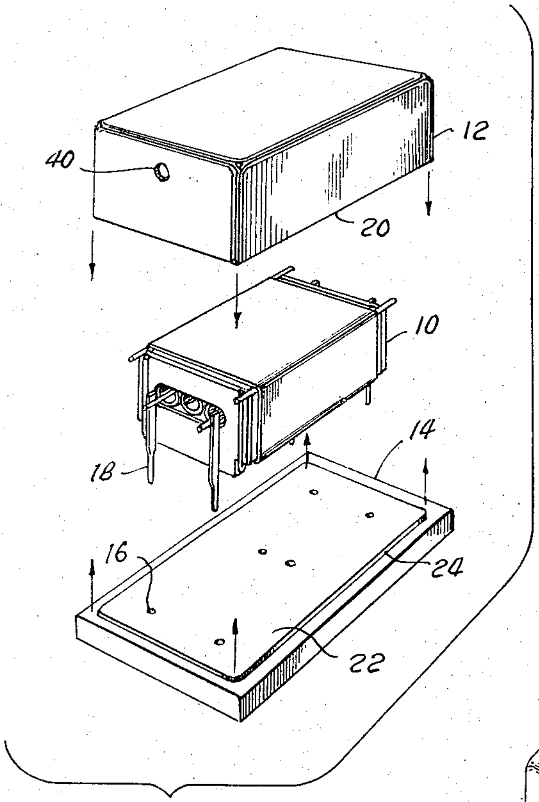
FIGURE 1 is an expanded perspective view of an assembly to be impregnated in accordance with the present invention.

Turning now to FIGURE 1 of the drawings, in accordance with a specific example of the invention to be described, the component to be encapsulated is a reed relay 10. The reed relay 10 is adapted to be placed within a case 12, with case 12 to be filled with the impregnating resin, suitably an epoxy resin. There is also provided a carrier block 14 which is formed of Teflon or other suitable material to which the encapsulating resin will not adhere. Carrier block 14 is provided with a plurality of holes 16 adapted to receive the leads or terminals 18 of the device 10 to be encapsulated. It will be noted that the configuration or arrangement of the hole 16 formed in the carrier block 14 determines the terminal configuration of the completed product and, accordingly, any desired terminal configuration could be obtained by the simple expedient if provided the necessary holes 16 in the carrier block 14, without resort to expensive tooling required if insulating headers are to be utilized. Utilization of the principles of the present invention is therefore possible to obtain any desired lead configuration and utilize the desired number of leads of a wide variety of products without the necessity for incurring substantial tooling expense or being restricted to the lead configuration of presently available headers. However, conventional headers can be utilized.

It will be noted that the under side 20 of the case 12 is open for purposes of receiving the device 10 and that the upper surface 22 of the carrier block 14 is shaped to conform to the opening in the case 12 such that when the shaped upper portion 24 of the carrier block 14 is inserted into the open side 20 of case 12, the device 10 will be appropriately centered within case 12. In this connection, it will be noted that it is not necessary that carrier block 14 be in the form shown but rather that a mounting plate, suitably formed out of kraft or fish paper or other insulating material having holes corresponding to the holes in the carrier block can be utilized to provide the desired positioning function. Alternatively, a conventional header could be used.

Figure 2:
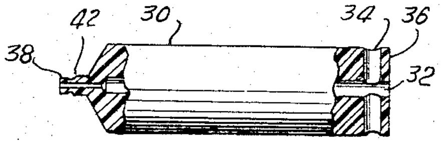
FIGURE 2 is a side elevation view, partially in cross section, illustrating a member utilized with the elements of FIGURE 1 in the practice of a preferred embodiment of the invention.
Figure 3:
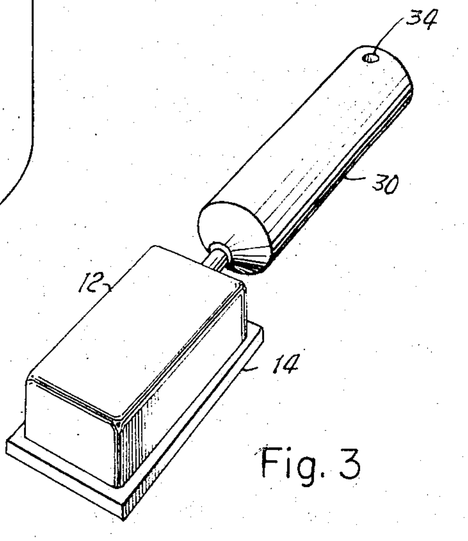
FIGURE 3 is a perspective view illustrating the items of FIGURES 1 and 2 in assembled form.
Figure 4:
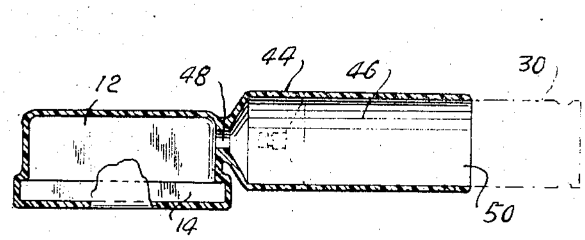
FIGURE 4 is a side elevation view, partially in cross section of the assembly of FIGURE 3 at a subsequent stage in the practice of the process of the present invention.

Turning now to FIGURE 2 of the drawings, there is shown a member 30 utilized in the practice of one embodiment of the present invention. The member 30 is suitably of generally cylindrical configuration having an axially positioned bore 32 extending therethrough. There is also suitably provided a radially extending bore 34 positioned near the end 36. The opposite end 38 of the member 30 is suitably of reduced cross sectional area of a diameter only slightly larger than the aperture 40 formed in one end of the case 12. An annular circumferential groove 42 is suitably provided in the end portion 38 of reduced diameter adapted to receive the walls of case 12 when the end portion 38 is inserted into the aperture 40. It is to be noted that the member 30 is suitably formed of material such as Teflon which is deformable such that the end 38 may be forced into the aperture 40 with the member 30 thereafter being retained in the hole 40 with the wall of the case 12 positioned in the groove 42. In accordance with one preferred embodiment of the invention, the case 12, device 10, carrier block 14 and the member 30 are assembled into a unitary structure as shown in FIGURE 3 with the reduced end portion 38 of the member 30 extending into the aperture 40 of case 12 and with the device 10 being positioned onto the carrier block 14 and supported within the case 12. The case 12 may suitably be held to the carrier block 14 by tape, not shown, wrapped around the assembly or any other suitable means. The assembly shown in FIGURE 3 is thereafter dipped into a molten strippable material which forms a coating thereon. Thus, as shown in FIGURE 4, when the assembly of FIGURE 3 is dipped into the strippable material, a coating 44 is formed thereon which completely covers all of the surfaces of the assembly of FIGURE 3. A suitable strippable plastic coating is Westcoat No. 132, Type 2 manufactured by the Western Coating Company. However, a wide variety of such materials, many of which are used in the packaging industry, are known and can be utilized, it only being necessary that the plastic be one that will adhere lightly to the surfaces of the assembly of FIGURE 3, but be easily removable therefrom. Further, it is desirable that the coating be one that will not react with the encapsulating material and that the coating, when solidified, have sufficient strength to be self-supporting.

Alternatively, a disposable member shaped to define a cavity having a volume greater than the volume of the case 12 can be used. In such an instance, it is desirable that the member include an aperture of reduced diameter and that the member be positioned with the aperture in the member providing communication between the cavity and the aperture formed in the case.

After dipping the assembly of FIGURE 3 into the strippable material, at such time as the strippable material has hardened, the member 30 is removed, as indicated in FIGURE 4. The radial bore 34 is useful for handling the assembly and for connection to member 30 when member 30 is removed. When the member 30 is removed, a reservoir will be defined by that portion of the plastic 44 which had encased the member 30. The reservoir 46 will be in communication with the interior of the case 12 by way of aperture 40. The reservoir 46 provided upon removal of the mold element 30 is suitably characterized by a greater volume than that of the case 12.

It will be noted that reservoir 46 is open at the end 50. When positioned in an upright position with end 50 at the top, reservoir 46 can be filled with a metered amount of the resin to be utilized for impregnation of the device 10 and by thereafter subjecting the unit to successive cycles of vacuum and pressure, the resin contained within reservoir 46 will be forced into the case 12, impregnating the device 10. The amount of resin used is not critical, providing an important advantage over many prior art processes in which the metering of the resin is quite critical if acceptable results are to be obtained. It will be noted, however, that the carrier block 14 and the strippable material 44 cooperate to prevent the resin from coming into contact with undesired portions of case 12 or the leads 18 of device 10. At the completion of the curing of the resin, the strippable plastic 44 can be removed, discarded and a carrier block 14 can be removed and reused. The base of the completed device resulting utilizing the process of the present invention is characterized by being a flat, void free surface rather than being characterized by the concave surface characteristic of the devices in which the resin is poured into the open end of the case which results from surface tension of the resin for the walls and leads of the device. Further, since there is no possibility of the resin coming into contact with the surfaces of the case 12, it is feasible to paint and symbolize the case prior to the impregnating operation. Since none of the resin comes in contact with the leads below the surface 22 of the carrier block 14, there is no necessity to clean or otherwise remove the epoxy from the leads, as it never comes in contact therewith.

It will be appreciated that the carrier block is not essential in all instances. Thus, carrier block 14 can be utilized for assembly of the device 10 in order to insure that the proper lead spacing will be present. Thereafter, a sheet of suitable material such as kraft paper, fish paper or other suitable material can be slipped over the leads and positioned flush with the bottom of the case 12 to prevent the strippable material entering the case 12. Thereafter, the process will proceed as described above, with the strippable material masking the portion of the leads extending outside the case 12 from the resin used for impregnation.

Figure 5:
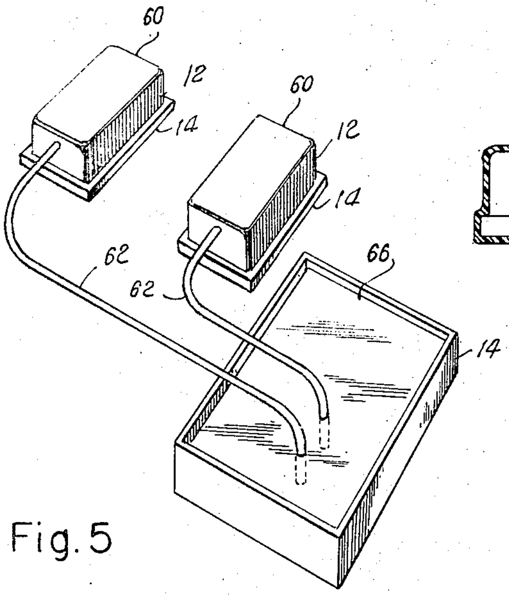
FIGURE 5 is a perspective view illustrating another embodiment of the present invention.

There is shown in FIGURE 5 an alternative embodiment of the invention in which rather than use the member 30 as shown in FIGURE 2 a length of tubing of Teflon or other material to which the strippable material will not readily adhere may be inserted into the aperture 40 formed in the case 12. When the tubing and the assembly is inserted into the strippable material, assemblies designated generally by the reference character 60 as shown in FIGURE 5 will be provided, each of the assemblies 60 comprising a case 12, carrier block 14 with the unit 10 positioned inside case 12, and a flexible tube 62. The Teflon tubing can then be removed from the flexible tube 62 and the open ends of the tube 62 inserted into a container 64 containing a suitable resin 66. When the container 64 and the unit 60 are positioned within a suitable vessel and subjected to alternate cycles of vacuum and pressure, the resin will be forced from the container 64 into the case 12 for purposes of impregnating the device 10 positioned within the case 12. Alternatively, the tubing can be left in place providing the necessary passageway, in which event the tubing need not be of a material to which the strippable material will not readily adhere.

It will be appreciated that in the device of FIGURE 2 it is desirable that the axial bore 32 be provided as the strippable plastic will normally be applied when in a heated, molten state and the bore 32 provides a vent for passes within the case 12 which may expand as a result of being subjected to the heat of the strippable plastic, preventing formation of any bubbles in the coating of strippable plastic over the assembly. Further, in the embodiment of the invention shown in FIGURE 5 it is desirable that the Teflon tubing be removed, as once it is filled with the resin, it normally would not be reusable. Also, if the tubing is not removed, the case will not be filled flush with its exterior surface.

Although the invention has been described with reference to a particular preferred embodiment thereof, many changes and modifications will become apparent to those skilled in the art in view of the foregoing description which is intended to be illustrative and not limiting of the invention defined in the appended claims.

What we claim is:

1. A method of impregnation comprising the steps of:

(a) positioning a device to be impregnated within a case having an aperture;

(b) positioning a member having an opening therein in communicating relationship with said aperture with said member extending from said case;

(c) applying a coating of strippable material over said case and said member;

(d) filling said case with impregnating material through said aperture and one of the openings in said member and a passageway formed in said strippable material by removal of said member; and (e) removing said strippable material.

2. A method as defined in claim 1 wherein said member is shaped to define a cavity having a volume greater than the volume of said case.

3. A method of impregnation as defined in claim 1 wherein said member has an outer surface of polytetrafluoroethylene.

4. A method of impregnation as defined in claim 1 wherein said case includes an opening for receiving said device and further including the step of substantially closing said opening prior to application of said strippable material.

5. A method of impregnation as defined in claim 1 wherein said member includes a body portion of substantially greater cross section than said aperture whereby upon removal of said member a reservoir is formed having a volume sufficient to hold a quantity of impregnating material at least equal to that required to fill said case.

6. A method of impregnation as defined in claim 1 wherein said member is a length of tubing.

7. A method of impregnation as defined in claim 1 further including the step of curing the impregnating material prior to removal of the strippable material.

8. A method of impregnation as defined in claim 5 including the step of mounting said device onto a mounting plate and positioning said mounting plate to close said opening.

9. A method of impregnation as defined in claim 1 wherein said strippable material is a plastic material which can be melted for application to said case and said member but which is solid at ambient temperature and which adheres lightly to said case.

10. A method of impregnation as defined in claim 1 including the step of subjecting the device to alternate vacuum and pressure cycles for filling of said case.

11. A method of impregnation as defined in claim 1 wherein the impregnating material is an epoxy resin.

12. A method of impregnation as defined in claim 6 including the step of filling said reservoir with a quantity of impregnating material sufficient to fill said case and subjecting the device to at least one vacuum cycle to fill said case.

13. A method of impregnation as defined in claim 9 wherein said mounting plate is a header.

References Cited

UNITED STATES PATENTS

| | | | |
|---|---|---|---|
| 2,400,891 | 5/1946 | Sigmund et al. | 264—272 X |
| 2,562,741 | 7/1951 | Roberts et al. | 264—219 |
| 2,889,423 | 6/1959 | Yochum | 264—272 X |
| 2,922,734 | 1/1960 | Kohn et al. | 264—272 X |
| 3,240,848 | 3/1966 | Burke et al. | 264—272 X |
| 3,305,614 | 2/1967 | Parsons | 264—272 X |

ROBERT F. WHITE, *Primary Examiner.*

T. J. CARVIS, *Assistant Examiner.*